Patented Apr. 15, 1952

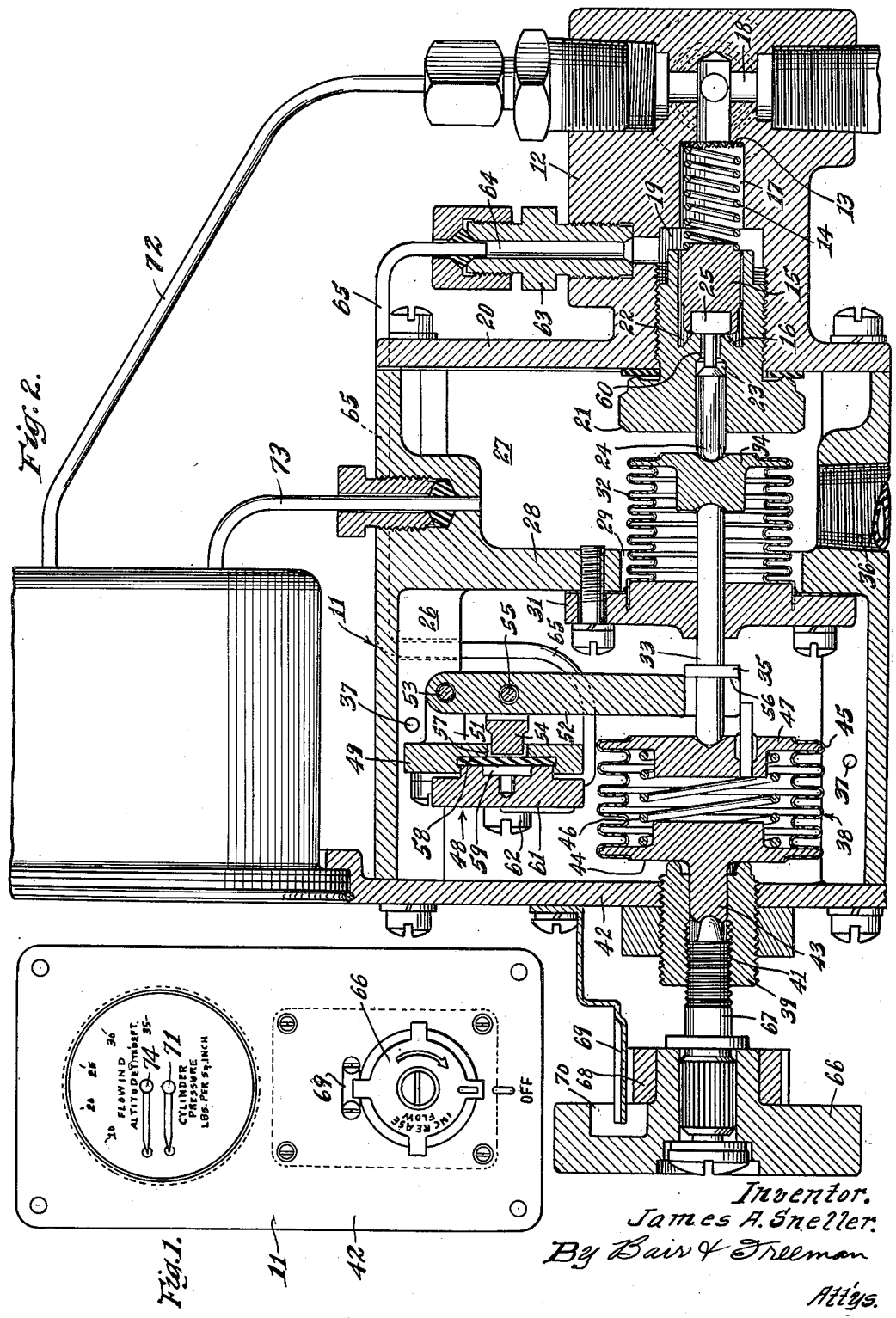

2,592,830

UNITED STATES PATENT OFFICE 2,592,830

CONTINUOUS FLOW OXYGEN REGULATOR

James A. Sneller, Cleveland, Ohio, assignor to The Aro Equipment Corporation, Bryan, Ohio, a corporation of Ohio Application June 13, 1946, Serial No. 676,436

5 Claims. (Cl. 137—153)

This invention relates to an oxygen regulator for breathing apparatus, and particularly to a pressure-balanced continuous flow oxygen regulator.

It is an object of the invention to provide an oxygen regulator which automatically maintains varying predetermined flows of oxygen according to altitude, regardless of pressure variations in the supply vessel or bottle.

It is also an object of the invention to provide an oxygen regulator including a means to compensate for diminishing pressure in the oxygen supply bottle, which is very light and occupies but little space, both of which features being of great value to airplane manufacturers and operators.

It is a further object of the invention to provide such a compensated oxygen regulator by one-stage regulation, and to eliminate two-stage regulation common in the prior art.

It is also an object of the invention to provide a novel combination of supply pressure compensation and aneroid loading which automatically varies the flow of oxygen with changes in altitude, regardless of variations in supply pressure.

It is still a further object of the invention to provide a unique manual over-ride for supplying additional quantities of oxygen in the event of extra physiological requirements of the human body due to abnormal activity at high altitudes.

It is another object of the invention to provide an oxygen regulator which will operate satisfactorily on either a high pressure supply, usually starting at about 2,000 pounds per square inch, or a low pressure supply, usually starting at about 500 pounds per square inch.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a front elevational view of an oxygen regulator embodying the invention; and Figure 2 is an enlarged vertical sectional view of the oxygen regulator shown in Figure 1.

Referring specifically to the drawings for a detailed description of the invention, numeral 11 designates the casing of an oxygen regulator which may be supplied as a permanent fixture to aircraft, equally supplying the needs of one person or a number of persons receiving oxygen from a manifold. The oxygen regulator may also be attached to a small oxygen reservoir and used as a portable unit supplying oxygen at stations in the aircraft not normally fitted with a manifold line.

High pressure oxygen enters at a manifold 12, usually at a pressure which varies from 2,000 to 25 pounds per square inch and passes through a filter screen 13 held in position by a valve spring 14 in a recess 17 communicating with inlet conduits 18 in manifold 12. The recess 17 is enlarged at 19 and contains a bored sealing plug 21 threaded therein and seated against a vertical wall 20. The sealing plug 21 contains a movable valve member 15 held against a seat 16 by the pressure of spring 14. The plug is recessed at 22 to a diameter larger than the valve member 15 to receive the same and form the seat 16.

The plug 21 is provided with a reduced circular bore 23 through which a pin 24 extends and normally contacts the head of the valve member 15 at 25. The pin 24 is preferably square in shape and is guided in the bore 23 but permits the free flow of oxygen therethrough when the valve 15 is opened.

The casing 11 is divided into two chambers 26 and 27 by a transverse partition 28 having an opening 29 therein, which is normally closed by a tightly sealed plate 31 supporting a pressure bellows 32 in chamber 27. The plate 31 is centrally bored to receive a sliding pin 33 having one end contacting a head 34 interiorly of bellows 32 and having its other end extending into chamber 26, which end is provided with a shoulder 35. Pin 24 is held in engagement with head 34 of bellows 32. An outlet opening 36 is provided in the casing in communication with the chamber 27.

The chamber 26 is subjected to atmospheric pressure only, because of suitable openings 37 provided in the walls thereof and an aneroid 38 is mounted within the chamber 26, a threaded plug 39 having a partially threaded bore 41 mounted on a transverse wall 42 of the casing 11 to receive an extension 43 of head 44 of the aneroid 38. The aneroid consists of the head 44, a sealed evacuated bellows 45 and a compression spring 46 which is held between head 44 and a bellows head 47 at the opposite end of bellows 45. The pin 33 is held in engagement with head 47 of bellows 45.

A pressure compensator generally indicated at 48 is also mounted in chamber 26. A supporting extension 49 is preferably formed integrally with the casing 11 and is provided with ears 51 pivotally supporting a lever arm 52 by pivot pin 53. The lever arm 52 is pivotally connected to a piston member 54 by a pivot pin 55 and engages the shoulder 35 on pin 33 at 56 on the side of the shoulder facing the aneroid 38.

The piston member 54 extends through an opening 57 in extension 49 and abuts against a heavy rubber or thin metal diaphragm 58 held in position in a recess 59 in extension 49 by a cap 61 held by screws 62.

The chamber 19 in manifold 12 is provided with a threaded plug 63 having a passageway 64 therein which communicates with the high pressure chamber 19 and with a conduit 65. The other end of conduit 65 is in communication with the recess 59, so that the pressure prevailing in chamber 19 is impressed on diaphragm 58. The relation of effective diaphragm area, lever 52 ratio, and area of a hole 60 in plug 21 are responsible for "compensation."

A manually rotatable knob 66 is threaded into bore 41 of plug 39 by a stem 67 and is accessible exteriorly of casing 11. Serrations 68 on the knob 66 engage a combination rotation-limiting-stop and click-stop finger 69. The rotation of the knob 66 is limited to 240° of movement to prevent overloading of the aneroid. This is accomplished by stop finger 69 which extends into a 240° arcuate recess 70 in knob 66. The 240° movement must be in conjunction with thread pitch 41 to limit longitudinal motion. Any combination of angular motion and thread pitch may be so selected.

A conduit 73 connects the low pressure chamber 27 with a flow indicator 74 calibrated according to altitude. The pressure in chamber 27 and the restricted outlet conduit 36 permit the flow meter 74 to be responsive to pressure in chamber 27 to in fact measure the flow through conduit 36. The relatively large volume of the low pressure chamber 27 and the relatively small cross sectional area of the outlet conduit provide that the velocity pressure in chamber 27 is relatively low, resulting in greatly increased accuracy in measurement of the true pressure within the chamber 27.

The measurement of the flow of oxygen in normal units, such as pounds per hour, is not necessary. Since the amount of required oxygen is a function of altitude, the flow is calibrated in thousands of feet of altitude so that the operator may set the knob 66 to make the flow indicator 74 correspond to the altitude of the plane (if such adjustment is necessary), as is well understood in the art. Since the construction of flow meter 74 is not a part of the present invention, no detailed description thereof is necessary.

*Operation*

High pressure oxygen enters the manifold 12 through one of the four passages 18, two of the other passages being plugged and one communicating with a pressure gauge 71 by a conduit 72, so that supply pressure may be ascertained. The oxygen passes through screen 13 and valve spring 14 forces valve 15 against seat 16, thus tending to prevent oxygen from entering chamber 27 of the regulator.

As the airplane gains altitude, the aneroid 38 exerts an increasing force through spring 46 and pressure in the aneroid on the pressure bellows 32 through pin 33. The oxygen breathing apparatus (not shown) is connected to outlet 36 in chamber 27, and therefore tends to reduce the pressure therein as oxygen is used. The increased pressure on bellows 32 causes valve 15 to open through pin linkage 24 and oxygen passes from high pressure chamber 19 to low pressure chamber 27 through bores or passages 22 and 23.

When the pressure in chamber 27 reaches a predetermined value, according to altitude, it is then sufficient to cause pressure bellows 32 to force pin linkage 33 back against the spring force of aneroid 38 and permit spring 14 to close valve 15. Thus a constant pressure depending on altitude is maintained in chamber 27.

The compensator mechanism 48 compensates for varying pressures in the oxygen supply cylinder and its affect on valve 15. When oxygen pressure is applied to high pressure chamber 19 and against valve 15, the same pressure is present on diaphragm 58. The diaphragm 58, therefore, pushes against lever arm 52 through piston member 54 and transmits a force in the direction opposite to the force of the oxygen on valve 15 through the pin linkage 33. The size of the valve 15 and diaphragm 58 is such that the forces exerted in both directions on valve 15 are balanced and varying supply pressures have no appreciable affect on the force required to operate the valve 15.

The manual control knob 66 is designed so that the force exerted by aneroid 38 may be increased manually at the will of the operator. By turning the knob 66 clockwise, the stem 67 compresses the aneroid 38 and supplements the spring force exerted thereby on the pressure bellows 32. Thus the pressure in chamber 27 is increased and the flow of oxygen increased to supply sufficient oxygen for the physiological requirements of the user due to abnormal activities at high altitude. A conduit 73 connects the chamber 27 with an altimeter indicated generally at 74.

As stated, the rotation of the knob 66 is here limited to 240° to prevent overloading the aneroid which would cause valve 15 to be held open and admit full cylinder pressure to the low pressure manifold. The click-stops prevent accidental movement of the knob 66 after it has been adjusted to the desired setting. When the knob 66 is turned to the "off" position, the aneroid 38 resumes its normal setting and the normal flow rates are supplied.

Some changes may be made in the construction and arrangement of the parts of my oxygen regulator without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. An oxygen regulator comprising a regulator casing, a high pressure chamber in the casing for receiving high pressure oxygen, a low pressure chamber in the casing for receiving low pressure oxygen from the high pressure chamber, a control valve between said high pressure chamber and said low pressure chamber, said high pressure oxygen tending to force said valve to a closed position, an inlet to said high pressure chamber, an outlet conduit from said low pressure chamber, a pressure responsive bellows subject on one side thereof to the pressure of the oxygen within said low pressure chamber, the other side of said bellows being subject to atmospheric pressure, an aneroid subjected to atmospheric pressure, a pressure responsive compensator having a movable member therein, means connecting said high pressure chamber to said pressure responsive compensator whereby the movable member therein is subjected to the same high pressure, a rigid link slidably journalled intermediate its ends in said casing and engaged in bearing relation at the ends thereof by said aneroid and said pressure responsive bellows, means biasing said control valve into bearing engagement with said pressure responsive bellows, whereby the forces of the aneroid and the pressure responsive bellows are transmitted to the control valve, and means for transmitting the force exerted by the movable member in said compensator to said rigid link to move said valve toward a valve opening position, said aneroid acting against the pressure of said bellows to open said valve upon increases in altitude to maintain a pressure in said low pressure chamber at a predetermined value below inlet pressure depending on said altitude, said valve and said compensator movable member being so dimensioned that the effect of said high pressure oxygen on said valve is substantially balanced regardless of the pressure of the high pressure oxygen.

2. An oxygen regulator comprising a regulator casing, a high pressure chamber in the casing for receiving high pressure oxygen, a low pressure chamber in the casing for receiving low pressure oxygen from the high pressure chamber, a control valve between said high pressure chamber and said low pressure chamber, said high pressure oxygen tending to force said valve to a closed position, an inlet to said high pressure chamber, an outlet conduit from said low pressure chamber, a pressure responsive bellows subject on one side thereof to the pressure of the oxygen within said low pressure chamber, the other side of said bellows being subject to atmospheric pressure, the volume of said low pressure chamber being sufficiently large to provide a surge chamber having substantially uniform pressure therein, whereby the pressure responsive bellows will not be subjected to widely or rapidly varying oxygen pressures, a third chamber in said casing vented to atmospheric pressure, an aneroid mounted in said third chamber, a pressure responsive compensator mounted in said third chamber, said compensator having a movable member therein, means connecting said high pressure chamber to said pressure responsive compensator whereby the movable member therein is subjected to the same high pressure, a rigid link slidably journalled intermediate its ends in said casing and engaged in bearing relation at the ends thereof by said aneroid and said pressure responsive bellows, a spring in said high pressure chamber biasing said control valve into bearing engagement with said pressure responsive bellows, whereby the forces of the aneroid and the pressure responsive bellows are transmitted to the control valve, and means for transmitting the force exerted by the movable member in said compensator to said rigid link to move said valve toward a valve opening position, said aneroid acting against the pressure of said bellows to open said valve upon increases in altitude to maintain a pressure in said low pressure chamber at a predetermined value below inlet pressure depending on said altitude, said valve and the compensator movable member being so dimensioned that the effect of said high pressure oxygen on said valve is substantially balanced regardless of the pressure of the high pressure oxygen.

3. An oxygen regulator comprising a regulator casing, a high pressure chamber in the casing for receiving high pressure oxygen, a low pressure chamber in the casing for receiving low pressure oxygen from the high pressure chamber, a control valve between said high pressure chamber and said low pressure chamber, said high pressure oxygen tending to force said valve to a closed position, an inlet to said high pressure chamber, an outlet conduit from said low pressure chamber, a pressure responsive bellows subject on one side thereof to the pressure of the oxygen within said low pressure chamber, the other side of said bellows being subject to atmospheric pressure, means for measuring the pressure in the low pressure chamber, the volume of the low pressure chamber being sufficiently large to provide a surge chamber having substantially uniform pressure, whereby the pressure responsive bellows in said low pressure chamber will not be subjected to rapidly varying pressures, the cross sectional area of the outlet conduit being sufficiently small to provide a restriction to the flow of gas therethrough, said large-volume low pressure chamber and said small area outlet conduit cooperating whereby the flow of oxygen being delivered from said low pressure chamber may be accurately indicated, a third chamber in said casing vented to atmospheric pressure, an aneroid mounted in said third chamber, a pressure responsive compensator mounted in said third chamber, said compensator having a movable member therein, means connecting said high pressure chamber to said pressure responsive compensator whereby the movable member therein is subjected to the same high pressure, a rigid link slidably journalled intermediate its ends in said casing and engaged in bearing relation at the ends thereof by said aneroid and said pressure responsive bellows, means biasing said control valve into bearing engagement with said pressure responsive bellows, whereby the forces of the aneroid and the pressure responsive bellows are transmitted to the control valve, and means for transmitting the force exerted by the movable member in said compensator to said rigid link to move said valve toward a valve opening position, said aneroid acting against the pressure of said bellows to open said valve upon increases in altitude to maintain a pressure in said low pressure chamber at a predetermined value below inlet pressure depending on said altitude, said valve and said compensator movable member being so dimensioned that the effect of said high pressure oxygen on said valve is substantially balanced regardless of the pressure of the high pressure oxygen.

4. An oxygen regulator comprising a casing, said casing including a high pressure chamber for receiving high pressure oxygen, a low pressure chamber having an outlet conduit therefrom, and an atmospheric pressure chamber, a control valve between said high pressure chamber and said low pressure chamber, the pressure of the oxygen in the high pressure chamber tending to force said control valve to a closed position, a spring in said high pressure chamber cooperating with said valve to force said valve toward a closed position, an aneroid in said atmospheric pressure chamber, a bellows in said low pressure chamber subject to the pressure therein, the interior of said bellows being subject to atmospheric pressure, a casing wall between said low pressure chamber and said atmospheric pressure chamber, a link journalled intermediate its ends in said casing wall and in bearing engagement at one end with said aneroid and in bearing engagement at the other end with the interior of said bellows, a portion of said control valve being in bearing engagement with the exterior of said bellows, a rebalancing device subject to the pressure of the high pressure chamber and adapted to impose a force on said link in a direction opposite to that of the pressure force of the oxygen and the bias of said spring on the control valve, said aneroid acting against the pressure of said bellows to open said control valve upon increases in altitude to maintain a pressure in said low pressure chamber at a predetermined value and below the pressure in the high pressure chamber depending on said altitude, and said valve and said rebalancing device being so constructed that the effect of said high pressure oxygen on said control valve is substantially balanced regardless of the pressure of the high pressure oxygen.

5. An oxygen regulator as set forth in claim 4 including means for measuring the pressure in the low pressure chamber, and wherein the volume of said low pressure chamber is sufficiently large to serve as a surge chamber having substantially uniform pressure therein, whereby the pressure responsive bellows in said low pressure chamber will not be subject to rapidly varying pressures, said outlet conduit from said low pressure chamber being sufficiently small in area relative to said low pressure chamber to provide a restriction to the flow of gas therethrough, and said relatively large volume low pressure chamber and said relatively small area outlet conduit cooperating to eliminate sudden or sharp fluctuations in the pressure in said low pressure chamber, whereby the pressure and consequently the flow of oxygen being delivered from said low pressure chamber may be accurately measured.

JAMES A. SNELLER.

REFERENCES CITED

The following references are of record in the file of this patent:

UNITED STATES PATENTS

| Number | Name | Date |
|---|---|---|
| 338,477 | Buick | Mar. 23, 1886 |
| 627,448 | Thomas | June 20, 1899 |
| 646,428 | Hardie | Apr. 3, 1900 |
| 2,302,284 | Abbott | Nov. 17, 1942 |
| 2,313,149 | Jacobsson | Mar. 9, 1943 |
| 2,318,721 | Siver | May 11, 1943 |

FOREIGN PATENTS

| Number | Country | Date |
|---|---|---|
| 4,785 | Great Britain | Mar. 27, 1890 |
| 828,724 | France | Feb. 21, 1938 |